Sept. 24, 1935.  F. H. KELLEY  2,015,275
PORTABLE TABLE FOR JIG SAWS
Filed Aug. 29, 1934
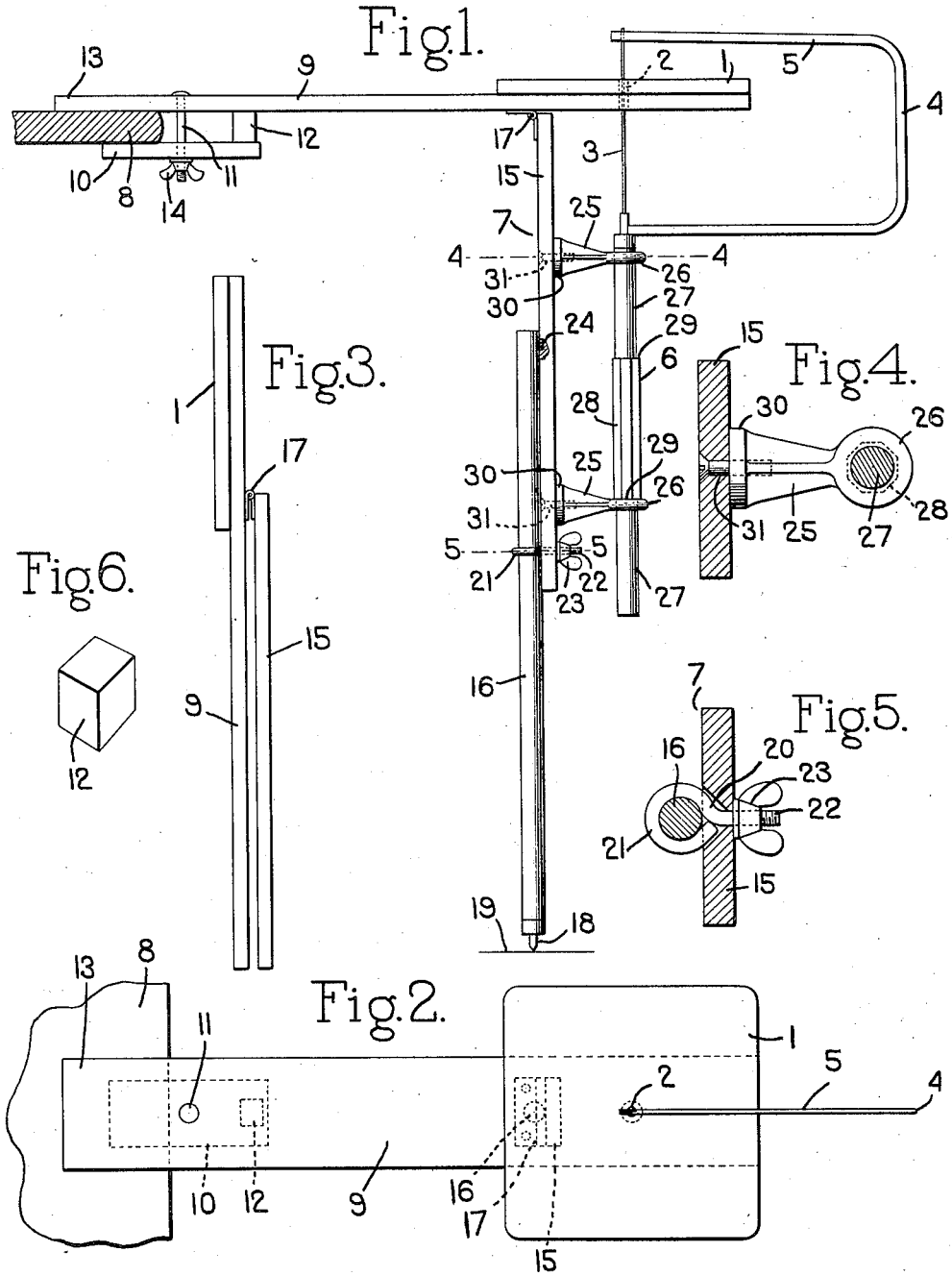
Inventor.
Frederick H. Kelley
by Heard Smith & Tennant.
Attys.

Patented Sept. 24, 1935

2,015,275

UNITED STATES PATENT OFFICE 2,015,275

PORTABLE TABLE FOR JIG SAWS

Frederick H. Kelley, Franklin, N. H., assignor to G. W. Griffin Co., Franklin, N. H., a corporation of New Hampshire Application August 29, 1934, Serial No. 741,955

1 Claim. (Cl. 143—70)

This invention relates to a portable table for jig saws and it has for its general object to provide an improved table for this purpose which is portable and which can be easily set up for operation in any location where there is a bench or a permanent table to which it may be clamped. My invention comprises a table element having an aperture to receive the blade of the jig saw, a pivoted leg member for supporting the table element, means to clamp said table element to a bench or some permanently located table, and saw-guiding means carried by the leg and adapted to guide the saw as it is manually operated.

The saw table is constructed so that it can be folded to make a compact unit for shipment or transportation and can be easily set up wherever it is to be used.

In order to give an understanding of the invention, I have illustrated a selected embodiment thereof in the drawing and the novel features will be pointed out in the appended claim.

In the drawing:

Fig. 1 is a side view of a saw table embodying my invention.

Fig. 2 is a top plane view.

Fig. 3 shows the table and one section of the leg folded for transportation.

Fig. 4 is an enlarged section on the line 4—4, Fig. 1.

Fig. 5 is an enlarged section on the line 5—5, Fig. 1.

Fig. 6 is a perspective view of the spacing block used in connection with the clamp.

The saw table element is shown at 1 and it is provided with an opening therethrough to receive the blade 3 of a saw 4 of the jig saw type. This saw comprises the usual C-shaped frame 5 to the ends of the arms of which the saw blade 3 is attached in some appropriate way. The saw frame is provided with the handle element 6 by which the saw is manually operated.

The table element is provided with a leg member 7 by which it is supported and also with suitable clamping means for clamping it to the edge 8 of a counter or bench or other permanent table. The table element is provided with arm or stem portion 9 and the clamping means is carried by the outer end of this stem portion. While any suitable clamping means may be provided, I have herein shown a clamping means which comprises a clamping jaw 10 connected to the arm or stem 9 through the medium of a clamping bolt 11, said jaw 10 being properly spaced from the arm 9 through the medium of a fulcrum block 12. The fulcrum block is preferably separate from the clamping jaw 10 and will be made so that it has a greater dimension in one direction than in another to enable it to be used with shelves or table tops 8 of different thicknesses.

The table member 1 is clamped to the shelf or support 8 by placing the end 13 of the stem on the top of the counter or support 8 and with the outer end of the clamping jaw 10 beneath said support. The fulcrum block 12 is then inserted between the clamping jaw and the under-side of the arm 9, said block being preferably so inserted that the dimension thereof at right angles to the arm 9 will be substantially equal to the thickness of the shelf, counter, or other support 8. The clamping bolt 11 is provided with a clamping nut 14 and by tightening the nut the stem 9 will be firmly clamped to the shelf or counter 8.

The leg element 7 by which the table 1 is supported, is preferably adjustable as to length so that its length can be adjusted to correspond to the height of the shelf or counter 8. This leg element 7 is formed with the two sections 15, 16 which are adjustably connected together. The section 15 is hinged to the under-side of the member 9 as shown at 17. The section 16 is shown in the form of a rod provided at its lower end with a spur 18 adapted to engage the floor 19. For clamping the rod section 16 to the other section 15 there is shown a clamping member in the form of an eye bolt 20, said clamping member having the eye 21 through which the rod section 16 extends and having the screw-threaded stem 22 which extends through the leg section 15 and which receives the clamping nut 23. The upper end of the leg section 16 is shown as provided with a spur 24 which is adapted to enter any one of a number of recesses with which the leg section 15 is provided.

When the clamping nut 23 is backed off, the leg section 16 is free to be adjusted longitudinally to the leg section 15 thereby to lengthen or shorten the leg element. When the proper adjustment has been made the clamping nut 23 is tightened, thereby drawing the leg section 16 into engagement with the leg section 15 and clamping the two sections together.

The table leg is provided with means for supporting and guiding the saw during its sawing movements. For this purpose the leg section 15 is shown as having two guiding members 25 each of which is provided with a guiding eye 26 through which the handle element 6 extends. This handle element 6 is provided with two cylindrical portions 27 which are received in the guiding eyes 26. The intermediate portion 28 of the handle element is slightly larger than the cylindrical portions 27 and is preferably made flat-sided to provide a better grip for the operator. The larger diametrical dimension of the hand-hold portion 28 provides shoulders 29 which co-operate with the guide eyes 26 to limit the up-and-down movement of the saw. The engagement of the lower shoulder 29 with the eye 26 of the lower guiding member 25 also serves as a support for the saw when the latter is not in use.

The guiding members 25 are shown as detachably secured to the leg section 15. Each guiding member is provided with a foot portion 30 which rests against the face of the leg section 15 and each guiding member is secured in place by means of a screw 31 which is entered through the leg section 15 from the rear and which has screw-threaded engagement with the corresponding guiding member.

When the saw table is to be packed for shipment or for storage, the leg section 16 and also the guiding members 25 are removed from the leg section 15, and the saw blade 3 is disconnected from the saw frame 5 so that the saw can be separated from the table. The table and leg section may then be folded as shown in Fig. 3 and such folded table and leg section, together with the leg section 16 and the detached saw and guiding members 25, can be packed in a compact bundle.

When the table is to be used the leg section 16 is assembled with the leg section 15 and the guiding members 25 together with the saw frame are also assembled with the leg section 15 and the table 1. The device is then clamped to the edge 8 of the counter or other permanent support and is ready for use. In using the device the material to be sawed is placed on the table 1 and the operator grasps the handle portion 28 of the saw and reciprocates the saw vertically. The guiding members 25 not only guide the saw in its vertical movement but also permit the saw to be turned into different positions about the axis of the handle, thereby providing for cutting out irregular shapes. The fact that the saw is supported and guided by the guiding members 25 enables an inexperienced person to use the saw without danger of injuring either the saw or the material being sawed.

While I have illustrated a selected embodiment of my invention, I do not wish to be limited to the constructional features shown.

I claim:

A saw table comprising an elongated portable table element, means removably carried by the table element at one end thereof to clamp it to the edge of a shelf, a two-part, lengthwise-adjustable supporting leg pivoted to said table element near the other end thereof, the two parts of the leg being separable, a pair of guiding members secured to the upper section of said supporting leg, said table element having an aperture between its outer end and said leg, a C-shaped saw frame having a saw blade extending through said aperture, a handle member secured to the saw frame and extending through and guided by the guiding members and also freely rotatable therein, the central portion of said handle member being of an enlarged diameter and forming a hand-hold portion which co-operates with the guiding members to limit the reciprocating movement of the saw frame.

FREDERICK H. KELLEY.